(12) United States Patent
Gu et al.

(10) Patent No.: US 10,409,979 B1
(45) Date of Patent: Sep. 10, 2019

(54) SYSTEMS AND METHODS FOR PREVENTING ADDICTIVE APPLICATION USAGE

(71) Applicant: Symantec Corporation, Mountain View, CA (US)

(72) Inventors: Lei Gu, Bedford, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 194 days.

(21) Appl. No.: 15/237,170

(22) Filed: Aug. 15, 2016

(51) Int. Cl.
G06F 21/50 (2013.01)
H04L 29/06 (2006.01)

(52) U.S. Cl.
CPC ............ G06F 21/50 (2013.01); H04L 63/102 (2013.01); *G06F 2221/2135* (2013.01)

(58) Field of Classification Search
CPC ................................ H04L 63/102; G06F 21/50
USPC .......................................................... 726/22
See application file for complete search history.

(56) References Cited

U.S. PATENT DOCUMENTS

| | | | | |
|---|---|---|---|---|
| 9,326,189 B2* | 4/2016 | Luna | | H04W 28/06 |
| 9,594,903 B1* | 3/2017 | L | | G06F 21/561 |
| 2008/0109872 A1* | 5/2008 | Walker | | G06Q 10/00 726/1 |
| 2009/0099965 A1* | 4/2009 | Grant, IV | | G06Q 20/105 705/41 |
| 2012/0101952 A1* | 4/2012 | Raleigh | | G06Q 30/016 705/304 |
| 2012/0191536 A1* | 7/2012 | Chen | | G06Q 30/02 705/14.49 |
| 2012/0258437 A1* | 10/2012 | Sadeh-Koniecpol | | G09B 5/00 434/362 |
| 2013/0014040 A1* | 1/2013 | Jagannathan | | G06Q 50/01 715/765 |
| 2014/0199664 A1* | 7/2014 | Sadeh-Koniecpol | | G09B 5/00 434/118 |
| 2015/0023552 A1* | 1/2015 | Rosen | | G06K 9/00362 382/103 |
| 2015/0310195 A1* | 10/2015 | Bailor | | G06F 21/316 726/6 |
| 2016/0301609 A1* | 10/2016 | Veres | | H04L 47/12 |
| 2016/0314158 A1* | 10/2016 | Kelly | | G06F 17/30345 |

OTHER PUBLICATIONS

Norton Family; https://family.norton.com/web/; Sep. 1, 2016.

\* cited by examiner

*Primary Examiner* — Jason K Gee
*Assistant Examiner* — Dereena T Cattungal
(74) *Attorney, Agent, or Firm* — FisherBroyles, LLP (57) ABSTRACT

A computer-implemented method for preventing addictive application usage may include (i) identifying a user of a software application, (ii) monitoring the user's habits in relation to accessing the software application, (iii) determining that the user's habits indicate potentially addictive behavior relative to a baseline behavior in relation to accessing the software application, and (iv) automatically executing an application control action in response to determining that the user's habits indicate potentially addictive behavior. Various other methods, systems, and computer-readable media are also disclosed.

20 Claims, 6 Drawing Sheets

SYSTEMS AND METHODS FOR PREVENTING ADDICTIVE APPLICATION USAGE

BACKGROUND

Application control software can provide security and prevent misuse of software applications. In particular, parental control software can help parents to manage how their children use technology. Traditionally, parental control solutions limit and restrict the types of content and applications that children may access and use. For example, a parent may want to prevent their child from using a mobile application that contains adult content, and parental control software would then allow the parent to set rules to prohibit the child from installing such applications. Typically, these restrictions prevent initial access to various content and applications.

However, in some cases, parents may also want to place restrictions on how applications are used after initial installation. Some applications may be allowed for installation but then require additional rules to further control use of the applications. Furthermore, traditional parental control solutions do not address behavioral issues such as addictive usage of applications. For example, a child may spend too much time on a particular application or exhibit other extreme behaviors when using the application. Parental control software may place overall controls on a device or on an application but may not provide the parent with information on how or when to place limits. Thus, better mechanisms for controlling applications are needed to prevent excessive use of potentially addictive applications. Accordingly, the instant disclosure identifies and addresses a need for additional and improved systems and methods for preventing addictive application usage.

SUMMARY

As will be described in greater detail below, the instant disclosure generally relates to systems and methods for preventing addictive application usage by monitoring user habits and comparing those habits with expected usage of applications. In one example, a computer-implemented method for preventing addictive application usage may include (i) identifying a user of a software application, (ii) monitoring the user's habits in relation to accessing the software application, (iii) determining that the user's habits indicate potentially addictive behavior relative to a baseline behavior in relation to accessing the software application, and (iv) automatically executing an application control action in response to determining that the user's habits indicate potentially addictive behavior.

In some embodiments, determining that the user's habits indicate potentially addictive behavior may include comparing a total access time the user spends using applications with an access time the user spends using the software application and/or comparing a total number of application notifications sent to the user with a number of notifications sent to the user from the software application. In other embodiments, determining that the user's habits indicate potentially addictive behavior may include determining that the user's habits in relation to accessing the software application significantly differ from the user's habits in relation to accessing at least one other application and/or determining that the user's habits in relation to accessing the software application significantly differ from at least one other user's access of the software application. Additionally or alternatively, determining that the user's habits indicate potentially addictive behavior may include determining that an access time the user spends using the software application is greater than a predetermined threshold.

In some examples, executing the application control action may include alerting an administrator of the potentially addictive behavior, blocking the user from accessing the software application, and/or adjusting the baseline behavior. In these examples, adjusting the baseline behavior may include adding the user's habits to a dataset that includes usage habits of a group of users and using the user's habits, along with the usage habits of the group of users, to calculate the baseline behavior.

In one example, the computer-implemented method may further include assigning an addictiveness score to the software application. In this example, executing the application control action may include sending the addictiveness score to an administrator and/or blocking an installation of the software application based on the addictiveness score.

In one embodiment, a system for implementing the above-described method may include (i) an identification module, stored in memory, that identifies a user of a software application, (ii) a monitoring module, stored in memory, that monitors the user's habits in relation to accessing the software application, (iii) a determination module, stored in memory, that determines that the user's habits indicate potentially addictive behavior relative to a baseline behavior in relation to accessing the software application, and (iv) an execution module, stored in memory, that automatically executes an application control action in response to determining that the user's habits indicate potentially addictive behavior. In addition, the system may include at least one processor that executes the identification module, the monitoring module, the determination module, and the execution module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a user of a software application, (ii) monitor the user's habits in relation to accessing the software application, (iii) determine that the user's habits indicate potentially addictive behavior relative to a baseline behavior in relation to accessing the software application, and (iv) automatically execute an application control action in response to determining that the user's habits indicate potentially addictive behavior.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of representative embodiments and are a part of the specification. Together with the following description, these drawings demonstrate and explain various principles of the instant disclosure.

Throughout the drawings, identical reference characters and descriptions indicate similar, but not necessarily identical, elements. While the representative embodiments described herein are susceptible to various modifications and alternative forms, specific embodiments have been shown by way of example in the drawings and will be described in detail herein. However, the representative embodiments described herein are not intended to be limited to the particular forms disclosed. Rather, the instant disclosure covers all modifications, equivalents, and alternatives falling within the scope of the appended claims.

DETAILED DESCRIPTION OF REPRESENTATIVE EMBODIMENTS

The present disclosure is generally directed to systems and methods for preventing addictive application usage. As will be explained in greater detail below, by monitoring a user's access of an application, the systems and methods disclosed herein may determine that the user is potentially addicted to the application. For example, by comparing the user's access of the application against the user's access of other applications or the behavior of other users, the disclosed systems and methods may determine that the user exhibits unusual behavior that may indicate addictive use of the application. The disclosed systems and methods may then restrict the user's access to the addictive application.

Figure 1:
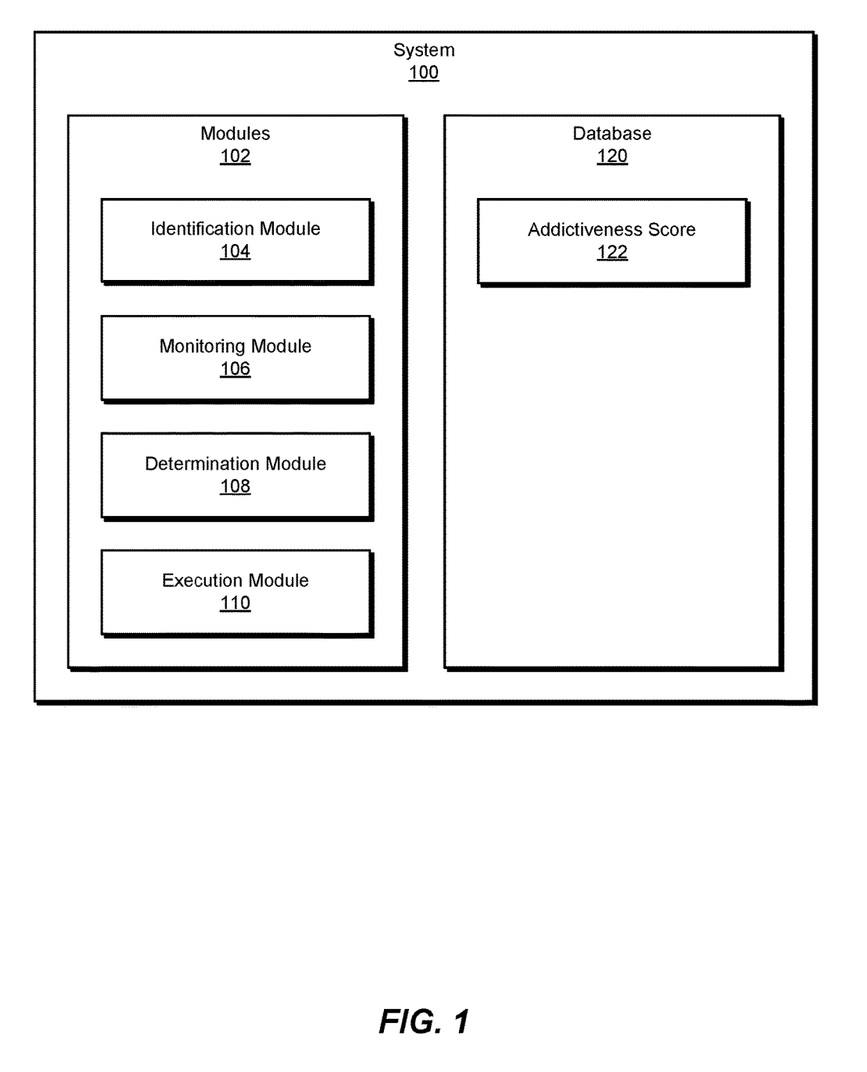
FIG. 1 is a block diagram of a representative system for preventing addictive application usage.
Figure 2:
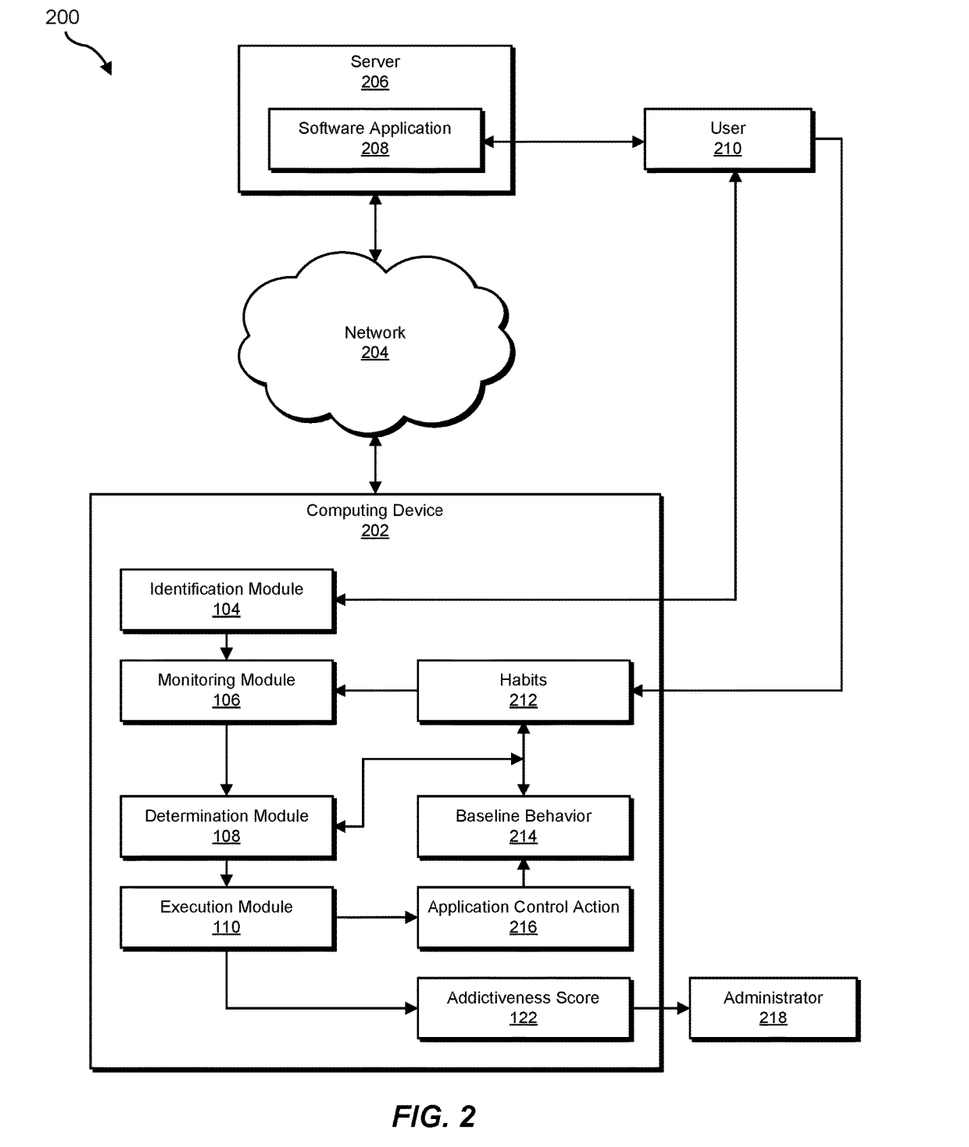
FIG. 2 is a block diagram of an additional representative system for preventing addictive application usage.

The following will provide, with reference to FIGS. 1 and 2, detailed descriptions of representative systems for preventing addictive application usage. Detailed descriptions of corresponding computer-implemented methods will also be provided in connection with FIG. 3. In addition, detailed descriptions of a representative determination that a representative user's habits indicate potentially addictive behavior will be provided in connection with FIG. 4. Furthermore, detailed descriptions of a representative computing system and network architecture capable of implementing one or more of the embodiments described herein will be provided in connection with FIGS. 5 and 6, respectively.

FIG. 1 is a block diagram of representative system 100 for preventing addictive application usage. As illustrated in this figure, representative system 100 may include one or more modules 102 for performing one or more tasks. For example, and as will be explained in greater detail below, representative system 100 may include an identification module 104 that identifies a user of a software application. Representative system 100 may additionally include a monitoring module 106 that monitors the user's habits in relation to accessing the software application. The term "habit," as used herein, generally refers to a pattern of behavior or a series of actions that are regularly repeated. In particular, a habit in relation to accessing a software application may include patterns in accessing, viewing and/or otherwise interacting with the software application.

Representative system 100 may also include a determination module 108 that determines that the user's habits indicate potentially addictive behavior relative to a baseline behavior in relation to accessing the software application. As used herein, the term "addictive behavior" generally refers to a behavior or action that compulsively seeks a positive stimulus, such as a positive response from an application. The term "baseline behavior," as used herein, generally refers to a behavior or action that is considered standard or normal under a given set of circumstances. An addictive behavior may be a behavior that is significantly more compulsive than a baseline behavior.

Representative system 100 may additionally include an execution module 110 that automatically executes an application control action in response to determining that the user's habits indicate potentially addictive behavior. The term "application control action," as used herein, generally refers to an action that controls the functions of a software application on a device and/or the interactions between a user and the application. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of representative network architecture 600 in FIG. 6. One or more of modules 102 in FIG. 1 may also represent all or portions of one or more special-purpose computers configured to perform one or more tasks.

As illustrated in FIG. 1, representative system 100 may also include one or more databases, such as database 120. In one example, database 120 may be configured to store an addictiveness score 122, which may indicate a likelihood that a user may exhibit addictive behavior relative to accessing a software application.

Database 120 may represent portions of a single database or computing device or a plurality of databases or computing devices. For example, database 120 may represent a portion of server 206 in FIG. 2, computing system 510 in FIG. 5, and/or portions of representative network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of representative network architecture 600 in FIG. 6.

Representative system 100 in FIG. 1 may be implemented in a variety of ways. For example, all or a portion of system 100 may represent portions of system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and computing device 202 may be merged into a single machine or computing system such that the functionality of each of modules 102 is provided within a single device.

In one embodiment, one or more of modules 102 from FIG. 1 may, when executed by at least one processor of computing device 202 and/or server 206, enable computing device 202 and/or server 206 to detect addictive behavior during the use of a software application. For example, and as will be described in greater detail below, identification module 104 may identify a user 210 of a software application 208. Monitoring module 106 may monitor habits 212 of user 210 in relation to accessing software application 208. Determination module 108 may determine that habits 212 indicate potentially addictive behavior relative to a baseline behavior 214 in relation to accessing software application 208. Execution module 110 may automatically execute an application control action 216 in response to determining that habits 212 indicate potentially addictive behavior.

In the example of FIG. 2, and as will be explained in greater detail below, computing device 202 may first identify user 210 and determine that user 210 accesses software application 208. Computing device 202 may then monitor actions of user 210 when user 210 accesses software application 208 and compile habits 212 based on the monitored actions. Next, computing device 202 may compare habits 212 with baseline behavior 214 to determine habits 212 may indicate addictive behavior by user 210. Finally, computing device 202 may execute application control action 216 to control the potentially addictive behavior. Computing device 202 may modify baseline behavior 214 to increase accuracy of the detection of addictive behavior. Computing device 202 may also assign addictiveness score 122 to software application 208 and notify an administrator 218 of addictiveness score 122.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, representative computing system 510 in FIG. 5, or any other suitable computing device.

Server 206 generally represents any type or form of computing device that is capable of receiving, storing, and/or managing addictiveness scores for software applications. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), representative network architecture 600 in FIG. 6, or the like. Network 204 may facilitate communication or data transfer using wireless or wired connections. In one embodiment, network 204 may facilitate communication between computing device 202 and server 206.

Figure 3:
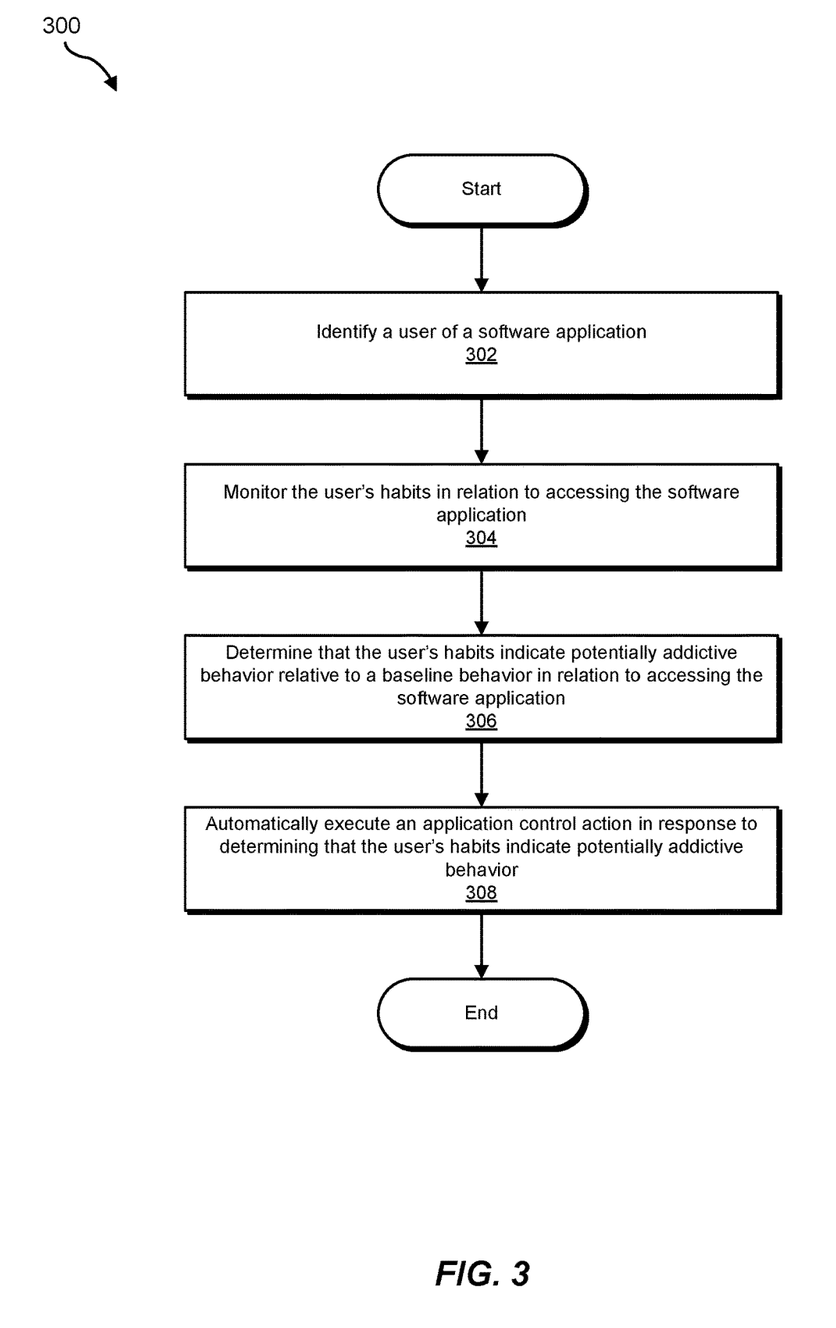
FIG. 3 is a flow diagram of a representative method for preventing addictive application usage.

FIG. 3 is a flow diagram of a representative computer-implemented method 300 for preventing addictive application usage. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of representative network architecture 600 in FIG. 6.

As illustrated in FIG. 3, at step 302, one or more of the systems described herein may identify a user of a software application. For example, identification module 104 may, as part of computing device 202 in FIG. 2, identify user 210 of software application 208.

Identification module 104 may identify user 210 in a variety of ways. In one embodiment, identification module 104 may identify user 210 using login information and/or biometric information. Identification module 104 may also identify a device user 210 uses to access software application 208. For example, identification module 104 may determine user 210 is the owner of a mobile device on which software application 208 has been installed.

Additionally or alternatively, identification module 104 may first identify software application 208. In this embodiment, identification module 104 may determine software application 208 is located on server 206 and user 210 accesses software application 208 through server 206. Alternatively, software application 208 may be installed on computing device 202 or a separate device, such as a mobile device, that user 210 may access and computing device 202 may monitor. Identification module 104 may then identify user 210 through a usage of software application 208.

Returning to FIG. 3, at step 304, one or more of the systems described herein may monitor the user's habits in relation to accessing the software application. For example, monitoring module 106 may, as part of computing device 202 in FIG. 2, monitor habits 212 of user 210 in relation to accessing software application 208.

Monitoring module 106 may monitor habits 212 in a variety of ways. In some examples, monitoring module 106 may monitor server 206 for all access from users to software application 208. In these examples, monitoring module 106 may directly monitor software application 208 and/or receive data on access habits of all users to software application 208, including habits 212, from server 206. In other examples, monitoring module 106 may monitor user 210 and/or a device of user 210. In these examples, monitoring module 106 may monitor all activity of user 210 on a device with software application 208 installed and collect habits 212 in relation to software application 208.

Furthermore, monitoring module 106 may monitor habits 212 by collecting data on a time of day and a duration of access to software application 208 by user 210. Habits 212 may also include information about a device through which user 210 accesses software application 208. For example, monitoring module 106 may collect data on the functions performed by software application 208 on the device of user 210 and/or the functions performed by user 210 through the use of software application 208. Monitoring module 106 may also count a frequency of such functions and/or a frequency of access to software application 208. Monitoring module 106 may additionally monitor other usage and behaviors of user 210 that may relate to software application 208.

Returning to FIG. 3, at step 306, one or more of the systems described herein may determine that the user's habits indicate potentially addictive behavior relative to a baseline behavior in relation to accessing the software application. For example, determination module 108 may, as part of computing device 202 in FIG. 2, determine that habits 212 indicate potentially addictive behavior relative to baseline behavior 214 in relation to accessing software application 208.

Determination module 108 may determine that habits 212 indicate potentially addictive behavior in a variety of ways. In some embodiments, determination module 108 may determine that habits 212 indicate potentially addictive behavior by comparing a total access time user 210 spends using applications with an access time user 210 spends using software application 208. For example, determination module 108 may compare a percentage of time user 210 spends using software application 208 against a distribution of time spent using other applications.

Additionally or alternatively, determination module 108 may compare a total number of application notifications sent to user 210 with a number of notifications sent to user 210 from software application 208. The term "notification," as used herein, generally refers to a message, a piece of news, or another form of communication transmitted from an application to a user. For example, a notification from software application 208 to user 210 may include an in-application reminder, an update, and/or an external message such as an email or Short Message Service (SMS) message. Determination module 108 may determine that baseline behavior 214 includes a typical access time and/or a typical number of notifications of software application 208. Determination module 108 may then determine that an excessive access time user 210 spends using software application 208 and/or an excessive number of notifications sent to user 210 from software application 208 indicates potentially addictive behavior by user 210.

In other embodiments, determination module 108 may determine that habits 212 indicate potentially addictive behavior by determining that habits 212 in relation to accessing software application 208 significantly differ from habits of user 210 in relation to accessing at least one other application. Additionally or alternatively, determination module 108 may determine that habits 212 in relation to accessing software application 208 significantly differ from at least one other user's access of software application 208. In these embodiments, baseline behavior 214 may include habits of user 210 in relation to accessing the other application and/or habits of the other user in relation to accessing software application 208.

Figure 4:
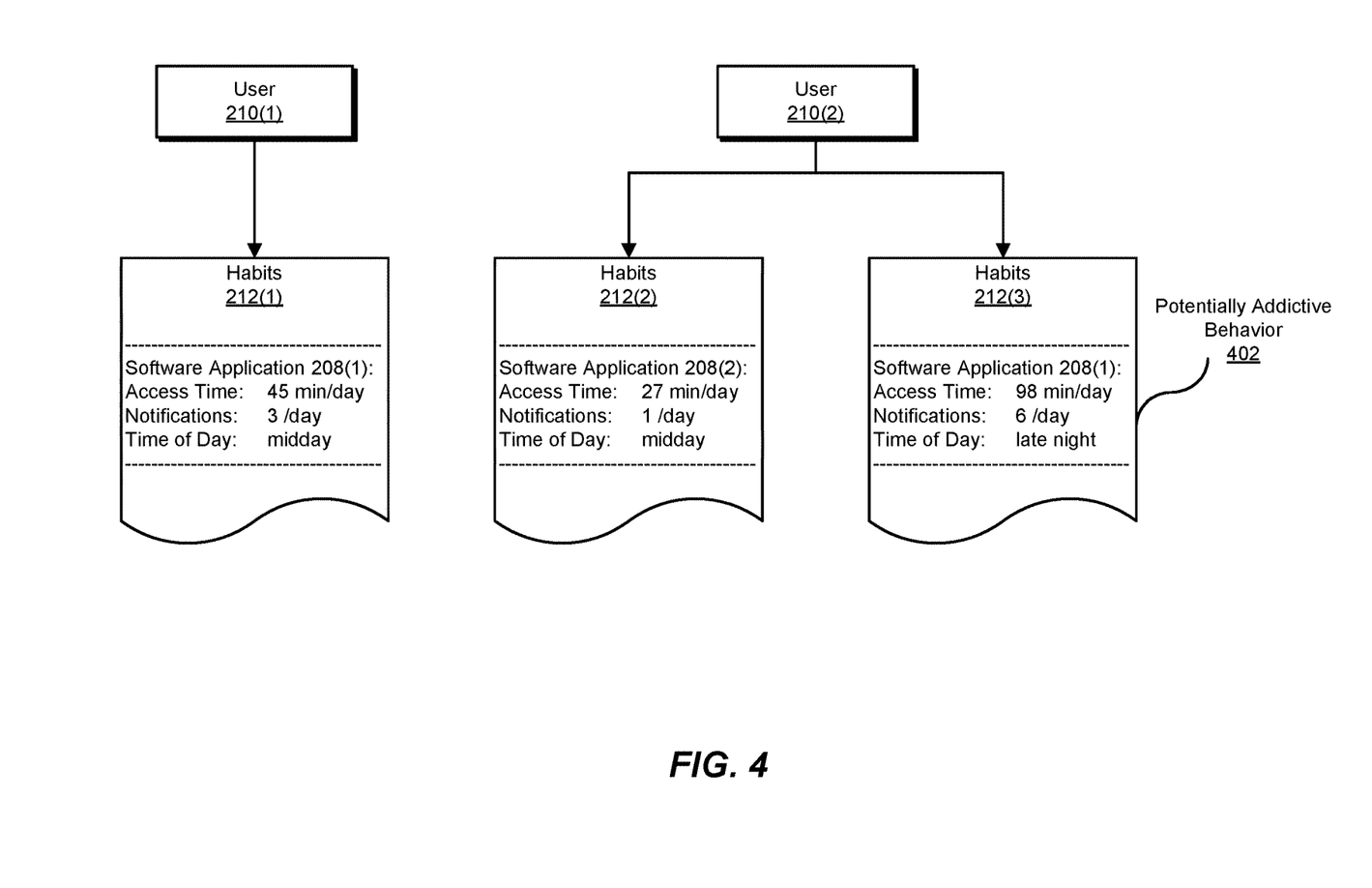
FIG. 4 is a block diagram of a representative determination that a representative user's habits indicate potentially addictive behavior.

For example, as shown in FIG. 4, habits 212(3) of a user 210(2) in accessing a software application 208(1) may be compared to habits 212(1) of a user 210(1) in also accessing software application 208(1). Habits 212(3) may also be compared to habits 212(2) of user 210(2) in accessing a different software application, such as software application 208(2). In this example, habits 212(1) and habits 212(2) may be used to form baseline behavior 214. Determination module 108 may then determine that habits 212(3) indicate a potentially addictive behavior 402 based on a longer access time in comparison to habits 212(1) and habits 212(2) (e.g., "98 min/day" compared to "27 min/day" and "45 min/day," respectively). Determination module 108 may also determine that habits 212(3) indicate potentially addictive behavior 402 based on a number of notifications (e.g., 6 compared to 1 and 3) and/or a time of day user 210(2) accesses software application 208(1) (e.g., "late night" compared to "midday").

In further embodiments, determination module 108 may determine that habits 212 in FIG. 2 indicate potentially addictive behavior by determining that an access time user 210 spends using software application 208 is greater than a predetermined threshold. In these embodiments, baseline behavior 214 may include the predetermined threshold, which may be manually set by an administrator, such as administrator 218, or calculated based on an actual usage of applications. For example, the systems described herein may first calculate an average access time of software application 208 by all users and set a predetermined threshold that significantly differs from the average access time. The predetermined threshold may also be set based on a comparison of access time user 210 spends using software application 208 to an access time of an application that is known to be potentially addictive for any user.

Determination module 108 may compare habits 212 with baseline behavior 214 in a variety of ways. In the above example, determination module 108 may derive a threshold from baseline behavior 214 and determine that a behavior exceeding the threshold may indicate potentially addictive behavior. In other examples, determination module 108 may use data mining methods to determine patterns that may indicate addictive behavior. For example, determination module 108 may compare habits 212 with baseline behavior 214 to find patterns of disruptive usage of software application 208 throughout a typical day, excessive numbers of interactions between user 210 and software application 208, overly quick responses by user 210 to notifications from software application 208, or other behaviors that are not common when compared to baseline behavior 214. In the example of FIG. 4, late night access of software application 208 may be determined to indicate addictive behavior. In this example, baseline behavior 214 may exclude behaviors predetermined to be excessive or extreme, such as access of software application 208 at an abnormal time of day.

Returning to FIG. 3, at step 308, one or more of the systems described herein may execute an application control action in response to determining that the user's habits indicate potentially addictive behavior. For example, execution module 110 may, as part of computing device 202 in FIG. 2, automatically execute application control action 216 in response to determining that habits 212 indicate potentially addictive behavior.

Execution module 110 may execute application control action 216 in a variety of ways. In one embodiment, execution module 110 may execute application control action 216 by alerting administrator 218 of the potentially addictive behavior, blocking user 210 from accessing software application 208, and/or adjusting baseline behavior 214. Application control action 216 may include actions to control software application 208 and/or functions to provide additional rules and thresholds for the use of software application 208. For example, application control action 216 may enforce a daily time limit for user 210 to prevent excessive use of software application 208. Alternatively, application control action 216 may limit how frequently software application 208 may send notifications to user 210. Application control action 216 may directly control software application 208 on server 206 or indirectly restrict user 210 from accessing software application 208, such as by controlling a mobile device of user 210 or constricting use of network 204 to access software application 208.

In additional embodiments, execution module 110 may adjust baseline behavior 214 by adding habits 212 to a dataset that may include usage habits of multiple users and using habits 212, along with the usage habits of the other users, to calculate baseline behavior 214. The dataset may be stored in database 120 or on a separate server or device. Adjusted baseline behavior 214, including habits 212 of user 210, may then be used to determine potential addictive behaviors for other users, other applications, or future use of software application 208. Furthermore, in these embodiments, baseline behavior 214 may be adjusted based on usage of applications over time. For example, as usage habits of users change in relation to access of software application 208, baseline behavior 214 may also change to reflect an adjustment of a standard usage of software application 208.

In some examples, the systems described herein may further include assigning addictiveness score 122 to software application 208. The term "addictiveness score," as used herein, generally refers to a score reflecting a likelihood of addictive behavior exhibited in the use of an application in comparison to the use of other applications. For example, the systems described herein may assign a higher addictiveness score to software application 208(1) in FIG. 4 than to software application 208(2), based on the association of potentially addictive behavior 402 with a use of software application 208(1). In these examples, execution module 110 may then execute application control action 216 by sending addictiveness score 122 to administrator 218 and/or blocking an installation of software application 208 based on addictiveness score 122. For example, execution module 110 may prevent an installation of any software application with an addictiveness score above a threshold set by administrator 218. Addictiveness score 122 may also change over time, based on a change in use of software application 208. Execution module 110 may then warn administrator 218 when addictiveness score 122 of software application 208 changes to exceed a threshold.

As explained above in connection with method 300 in FIG. 3, the disclosed systems and methods may, by monitoring usage of software applications, determine when a user exhibits potentially addictive behavior in using a specific software application. Specifically, the disclosed systems and methods may first monitor the habits of the user when accessing the software application. The systems and methods described herein may also monitor the habits of the user when accessing other applications and the habits of other users when accessing the software application. For example, the disclosed systems and methods may track the time that children spend on various applications and the number of notifications that are received from these applications and compare the habits of one child using a single software application with other children using the application. Furthermore, the systems and methods described herein may determine a baseline behavior, which may be considered normal use of the application, and compare the user's habits when accessing the software application with the baseline behavior to detect potentially addictive behavior.

After detecting potentially addictive behavior, the disclosed systems and methods may execute a control action to prevent further addictive behavior. In the above example, the disclosed systems and methods may limit how frequently the child may access the software application deemed to be potentially addictive. Alternatively, the disclosed systems and methods may assign an addictiveness score to the software application to indicate a comparative degree of addictiveness in contrast to other applications. The systems and methods described herein may then block the installation of applications with high addictiveness scores. The disclosed systems and methods may also alert an administrator about a potentially addictive application.

As detailed above, by comparing a single user's usage of a software application with the user's usage of other applications and/or other users' usages of the same software application, the disclosed systems and methods may determine that the user may exhibit addictive behavior. In addition, by controlling access to the potentially addictive application or preventing installation of the application, the disclosed systems and methods may prevent additional addictive usage of the application. Thus, the systems and methods described herein may provide better control for potentially addictive application use.

Figure 5:
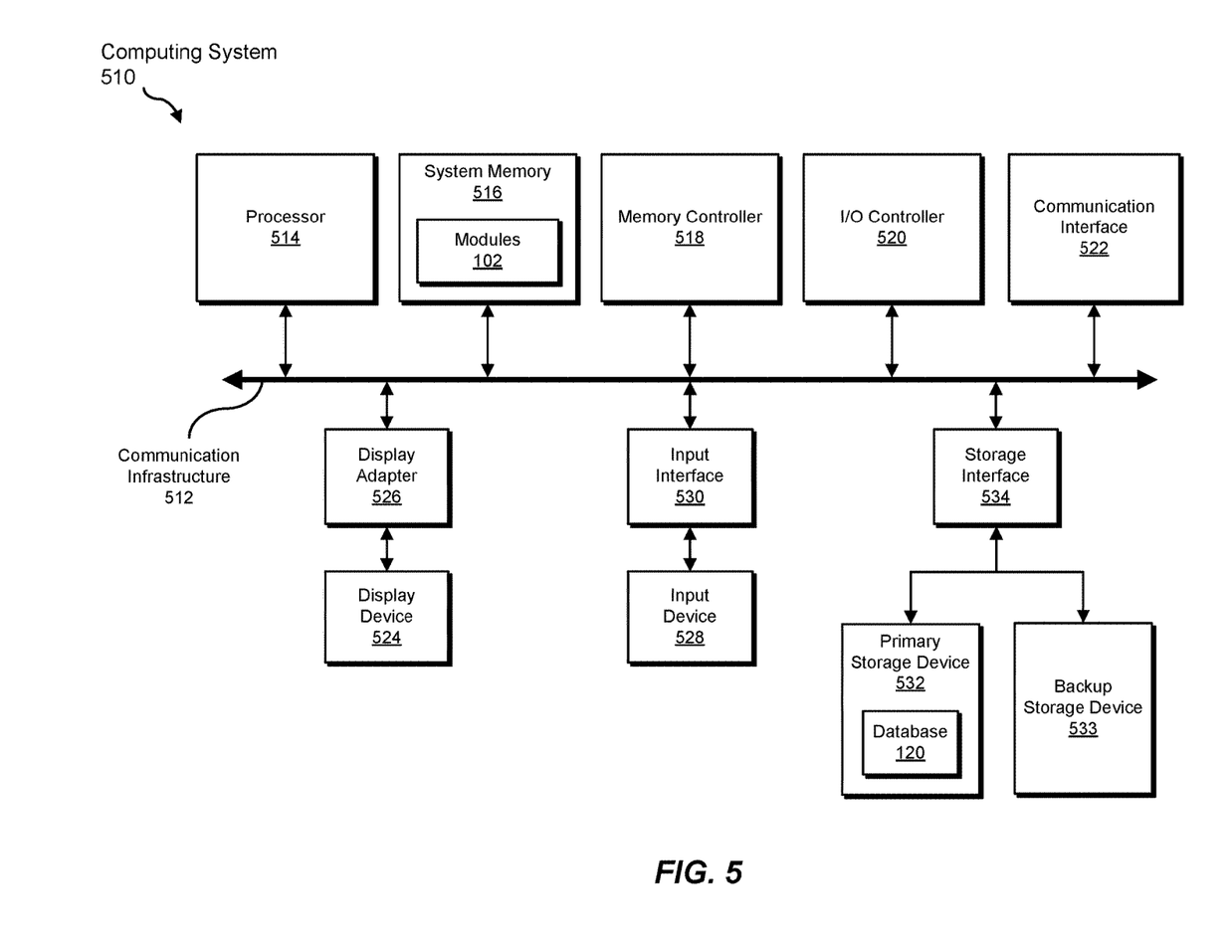
FIG. 5 is a block diagram of a representative computing system capable of implementing one or more of the embodiments described and/or illustrated herein.

FIG. 5 is a block diagram of a representative computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the representative embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, representative computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between representative computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, representative computing system 510 may also include at least one input device 528 coupled to communication infrastructure 512 via an input interface 530. Input device 528 generally represents any type or form of input device capable of providing input, either computer or human generated, to representative computing system 510. Examples of input device 528 include, without limitation, a keyboard, a pointing device, a speech recognition device, or any other input device.

As illustrated in FIG. 5, representative computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the representative embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the representative embodiments described and/or illustrated herein. Additionally or alternatively, one or more of the representative embodiments described and/or illustrated herein may be implemented in firmware and/or hardware. For example, computing system 510 may be configured as an Application Specific Integrated Circuit (ASIC) adapted to implement one or more of the representative embodiments disclosed herein.

Figure 6:
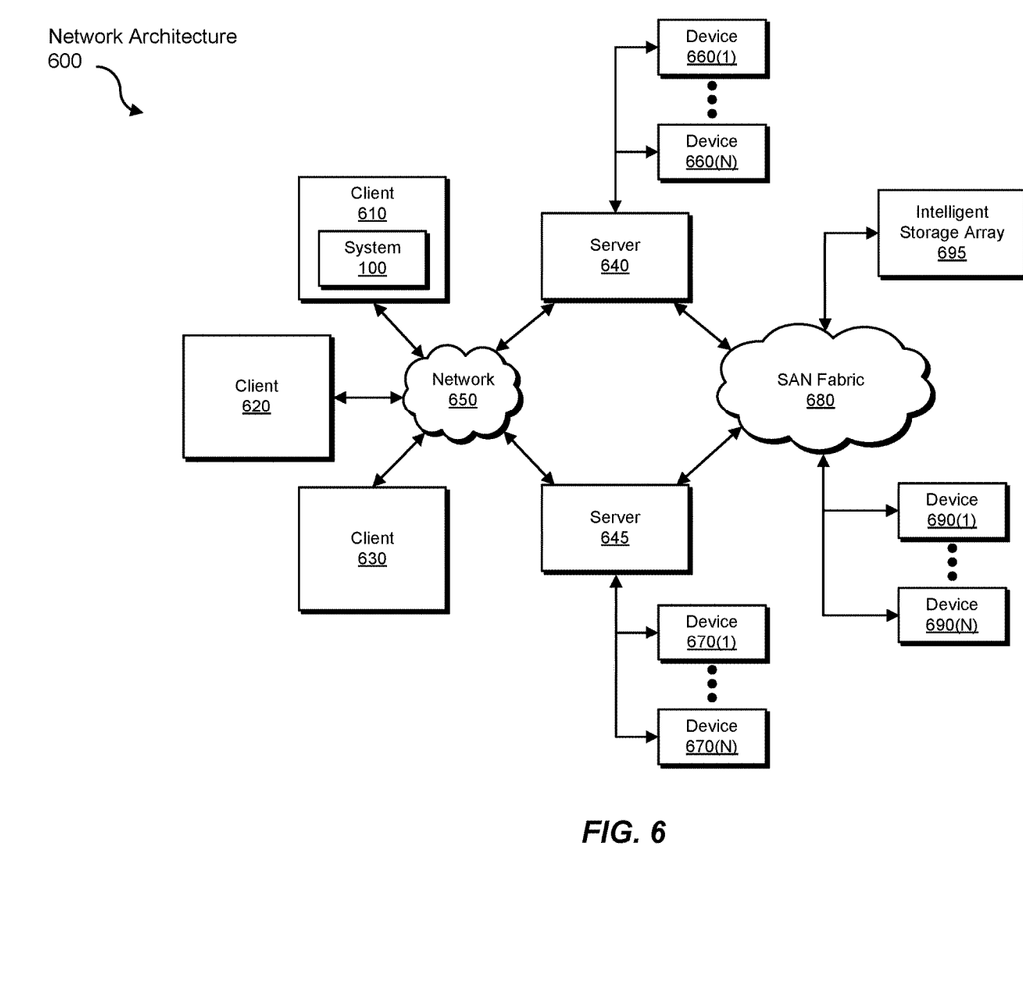
FIG. 6 is a block diagram of a representative computing network capable of implementing one or more of the embodiments described and/or illustrated herein.

FIG. 6 is a block diagram of a representative network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as representative computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to representative computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the representative embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the representative embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of a representative method for preventing addictive application usage.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered representative in nature since many other architectures can be implemented to achieve the same functionality.

In some examples, all or a portion of system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of representative system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of representative system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various representative methods described and/or illustrated herein may also omit one or more of the steps described or illustrated herein or include additional steps in addition to those disclosed.

While various embodiments have been described and/or illustrated herein in the context of fully functional computing systems, one or more of these representative embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the representative embodiments disclosed herein.

In addition, one or more of the modules described herein may transform data, physical devices, and/or representations of physical devices from one form to another. For example, one or more of the modules recited herein may receive information about software application habits of a user to be transformed, transform the information, output a result of the transformation to a storage or output device, use the result of the transformation to identify a potentially addictive behavior, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the representative embodiments disclosed herein. This representative description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing addictive application usage, at least a portion of the method being performed by a computing device comprising at least one processor, the method comprising:
   identifying a user of a software application;
   monitoring the user's habits in relation to accessing the software application;
   comparing the user's habits to a baseline behavior in relation to accessing the software application;

determining that the user's habits indicate potentially addictive behavior based on time spent on the software application relative to the baseline behavior in relation to accessing the software application, comprising:
comparing a total number of application notifications sent to the user with a number of notifications sent to the user from the software application to determine the time spent on the software application; and
automatically enforcing a daily time limit on the user's access to the software application in response to determining that the user's habits indicate potentially addictive behavior based on the comparison of the total number of application notifications sent to the user with the number of notifications sent to the user from the software application.

2. The method of claim 1, wherein determining that the user's habits indicate potentially addictive behavior further comprises:
comparing a total access time the user spends using applications with an access time the user spends using the software application.

3. The method of claim 1, wherein determining that the user's habits indicate potentially addictive behavior further comprises at least one of:
determining that the user's habits in relation to accessing the software application significantly differ from the user's habits in relation to accessing at least one other application; or
determining that the user's habits in relation to accessing the software application significantly differ from at least one other user's access of the software application.

4. The method of claim 1, wherein determining that the user's habits indicate potentially addictive behavior further comprises determining that an access time the user spends using the software application is greater than a predetermined threshold.

5. The method of claim 1, further comprising at least one of:
alerting an administrator of the potentially addictive behavior;
blocking the user from accessing the software application; or
adjusting the baseline behavior.

6. The method of claim 5, wherein adjusting the baseline behavior comprises:
adding the user's habits to a dataset that comprises usage habits of a plurality of users; and
using the user's habits, along with the usage habits of the plurality of users, to calculate the baseline behavior.

7. The method of claim 1, further comprising assigning an addictiveness score to the software application.

8. The method of claim 7, further comprising at least one of:
sending the addictiveness score to an administrator; or
blocking an installation of the software application based on the addictiveness score.

9. A system for preventing addictive application usage, the system comprising memory, the system comprising:
an identification module, stored in the memory, that identifies a user of a software application;
a monitoring module, stored in the memory, that monitors the user's habits in relation to accessing the software application;
a determination module, stored in the memory, that determines that the user's habits indicate potentially addictive behavior based on time spent on the software application relative to a baseline behavior in relation to accessing the software application by comparing the user's habits to the baseline behavior, comprising:
comparing a total number of application notifications sent to the user with a number of notifications sent to the user from the software application to determine the time spent on the software application;
an execution module, stored in the memory, that automatically executes an application control action including at least enforcing a daily time limit on the user's access to the software application in response to determining that the user's habits indicate potentially addictive behavior based on the comparison of the total number of application notifications sent to the user with the number of notifications sent to the user from the software application; and
at least one processor that executes the identification module, the monitoring module, the determination module, and the execution module.

10. The system of claim 9, wherein the determination module further determines that the user's habits indicate potentially addictive behavior by:
comparing a total access time the user spends using applications with an access time the user spends using the software application.

11. The system of claim 9, wherein the determination module further determines that the user's habits indicate potentially addictive behavior by at least one of:
determining that the user's habits in relation to accessing the software application significantly differ from the user's habits in relation to accessing at least one other application; or
determining that the user's habits in relation to accessing the software application significantly differ from at least one other user's access of the software application.

12. The system of claim 9, wherein the determination module further determines that the user's habits indicate potentially addictive behavior by determining that an access time the user spends using the software application is greater than a predetermined threshold.

13. The system of claim 9, wherein the execution module further executes the application control action by at least one of:
alerting an administrator of the potentially addictive behavior;
blocking the user from accessing the software application; or
adjusting the baseline behavior.

14. The system of claim 13, wherein adjusting the baseline behavior comprises:
adding the user's habits to a dataset that comprises usage habits of a plurality of users; and
using the user's habits, along with the usage habits of the plurality of users, to calculate the baseline behavior.

15. The system of claim 9, further comprising assigning an addictiveness score to the software application.

16. The system of claim 15, wherein the execution module further executes the application control action by at least one of:
sending the addictiveness score to an administrator; or
blocking an installation of the software application based on the addictiveness score.

17. A non-transitory computer-readable medium comprising one or more computer-executable instructions that, when executed by at least one processor of a computing device, cause the computing device to:

identify a user of a software application;

monitor the user's habits in relation to accessing the software application;

compare the user's habits to a baseline behavior in relation to accessing the software application;

determine that the user's habits indicate potentially addictive behavior based on time spent on the software application relative to a baseline behavior in relation to accessing the software application, comprising:

comparing a total number of application notifications sent to the user with a number of notifications sent to the user from the software application to determine the time spent on the software application; and automatically enforcing a daily time limit on the user's access to the software application in response to determining that the user's habits indicate potentially addictive behavior based on the comparison of the total number of application notifications sent to the user with the number of notifications sent to the user from the software application.

18. The non-transitory computer-readable medium of claim 17, wherein the computer-executable instructions further cause the computing device to determine that the user's habits indicate potentially addictive behavior by:

comparing a total access time the user spends using applications with an access time the user spends using the software application.

19. The non-transitory computer-readable medium of claim 17, wherein the computer-executable instructions further cause the computing device to determine that the user's habits indicate potentially addictive behavior by at least one of:

determining that the user's habits in relation to accessing the software application significantly differ from the user's habits in relation to accessing at least one other application; or determining that the user's habits in relation to accessing the software application significantly differ from at least one other user's access of the software application.

20. The non-transitory computer-readable medium of claim 17, wherein the computer-executable instructions further cause the computing device to determine that the user's habits indicate potentially addictive behavior by determining that an access time the user spends using the software application is greater than a predetermined threshold.

* * * * *